United States Patent [19]

Pfaendner et al.

[11] Patent Number: 6,028,129
[45] Date of Patent: Feb. 22, 2000

[54] INCREASING THE MOLECULAR WEIGHT OF POLYCONDENSATES AND STABILIZING THEM, USING DIEPOXIDES OF STERICALLY HINDERED AMINES

[75] Inventors: Rudolf Pfaendner, Rimbach; Alfred Steinmann, Praroman; Heinz Herbst, Heppenheim; Kurt Hoffmann, Weitenau-Steinen, all of Germany

[73] Assignee: Ciba Specialty Chemicals Corporation, Tarrytown, N.Y.

[21] Appl. No.: 09/234,254

[22] Filed: Jan. 20, 1999

[30] Foreign Application Priority Data

Jan. 26, 1998 [CH] Switzerland ................. 172/98

[51] Int. Cl.⁷ ................. C08K 5/34; C08K 5/53; C08K 3/34
[52] U.S. Cl. ................. 524/99; 524/99; 524/102; 524/125; 524/492; 528/492
[58] Field of Search ................. 524/99, 102, 125, 524/132; 528/492

[56] References Cited

U.S. PATENT DOCUMENTS

| 3,377,316 | 4/1968 | Reinking et al. | 524/99 |
| 3,692,778 | 9/1972 | Murayama et al. | 524/99 |
| 4,703,072 | 10/1987 | Helwig et al. | 524/99 |
| 5,747,606 | 5/1998 | Pfaendner et al. | 525/438 |
| 5,807,966 | 9/1998 | Pfaendner et al. | 528/286 |

FOREIGN PATENT DOCUMENTS 0410230  1/1991  European Pat. Off. .
0295906  12/1992  European Pat. Off. .

OTHER PUBLICATIONS

R.–E. Grützner et al., Kunststoffe, 82, (1992), 4, pp. 284–288.
S. Fakirov, Kunststoffe, 74, (1984), 4, pp. 218–221.
Chem Abstr. 91:124534a.
Derwent Abstr. 91–030649 for EP 410230.
Chem. Abstr. 1984:492273 for Kunststoffe 74, (1984), 4 pp. 218–221.

*Primary Examiner*—Kriellion Sanders
*Attorney, Agent, or Firm*—Luther A. R. Hall

[57] ABSTRACT

The invention relates to a process for increasing the molecular weight of polycondensates and at the same time stabilizing them, essentially without crosslinking, which comprises heating a polyamide, a polyester, a polycarbonate or a copolymer or blend of these polymers with addition of at least one diepoxide comprising terminal epoxide groups and as a further structural element a tetramethylpiperidine radical located centrally between the epoxide groups to a temperature which is above the melting point of the polymer in the case of crystalline polycondensates or above the glass point in the case of amorphous polycondensates. The invention additionally relates to mixtures comprising the corresponding diepoxides, to their use, and to polycondensates prepared from them.

17 Claims, No Drawings

INCREASING THE MOLECULAR WEIGHT OF POLYCONDENSATES AND STABILIZING THEM, USING DIEPOXIDES OF STERICALLY HINDERED AMINES

The invention relates to a process for increasing the molecular weight of polycondensates and at the same time stabilizing them against the effect of UV light and heat and to the polycondensates obtainable by the process.

Polycondensates, such as polyesters, polyamides and polycarbonates, are important engineering plastics with a wide variety of possible applications in the form, for example, of films, bottles, fibres and injection mouldings. A common feature of these polymers is that they are prepared by polycondensation reactions. Specific applications generally employ specific grades having a characteristic molecular weight range.

It would be desirable to use a polycondensate of low molecular mass which can be prepared in large quantities and which subsequently by means of a simple process is brought to the required or desired molecular weight.

Damage to polycondensates in the course of processing and use results in chain cleavage and so leads predominantly to polymer fragments having functional end groups.

The mechanical and physical properties are crucially dependent on the molecular weight of the polymer. High-quality recycling of used polyesters, polyamides and polycarbonates and of scrap from, for example, the fibre production and injection moulding sectors without aftertreatment is possible only to a limited extent owing to the reduced molecular weight.

The principle of improving the material properties of used or thermally or hydrolytically damaged polycondensates is known. For example, they can be subjected to postcondensation in the solid state (S. Fakirov, Kunststoffe 74 (1984), 218 and R. E. Grützner, A. Koine, Kunststoffe 82 (1992), 284). However, this method is protracted and, furthermore, is sensitive to such impurities as may be present in used material.

For the solid-phase condensation of polyamides it has also been proposed, in EP-0 410 230, to use phosphoric acid, phosphorous acid or phosphonous acid as catalyst.

F. Mitterhofer describes studies using a diphosphonite as processing stabilizer for polymer recyclates (C.A. 91, 124534).

It is also known that crosslinked polyamides can be obtained by using an epoxide and a customary polyamide catalyst, preferably sodium hypophosphite (EP-A-0 295 906). The crosslinked polyamides obtainable in this way typically have a very high melt viscosity relative to the initial polyamide, so greatly restricting the extent to which they can be processed.

U.S. Pat. No. 5,807,966 discloses a process which, likewise, permits an increase in the molecular weight of polycondensates, such as polyesters, polyamides and polycarbonates and also corresponding copolymers and blends, within a relatively short time, where the increase in molecular weight takes place essentially without crosslinking. There, at least one diphosphonite, or a mixture of at least one diphosphonite and at least one difunctional compound, such as a diepoxide, is added to the polycondensate and the mixture is heated until it melts.

For certain applications, the profile of required properties necessitates not only a high molecular weight but also sufficient long-term thermal stability and high light stability. In the prior art processes, this can be achieved by adding further components which specifically improve the required properties. In general, however, extensive formulation development is necessary for this purpose. It would therefore be advantageous to the user to have available an additive which meets all of the required properties directly.

It is therefore the object of the present invention to provide a suitable additive for increasing the molecular weight of polycondensation polymers, especially polyamides, and which additionally brings about good thermal stability and light stability.

The present invention solves this problem by employing diepoxides a substructure of which is a sterically hindered amine group.

The addition of such compounds to a polycondensate brings about a substantial increase in the molecular weight of the polycondensate and a considerable improvement in the mechanical properties following storage under warm conditions or weathering.

A feature of the diepoxides of the invention is that the increase in molecular weight is very rapid, so that only short reaction times are necessary. The bisphenol A-based diepoxides described in the prior art for increasing molecular weight are markedly lower in their reactivity, so necessitating a longer reaction time.

With the aid of the process of the invention it is possible to achieve an increase in molecular weight and heat/light stability in the case in particular of polycondensate recyclates from the collection of used industrial components, such as from automotive and electrical applications. This allows the recyclates to be employed again in their original applications.

In addition, owing to the simultaneous improvement in the light and heat stability, it is possible to extend the field of use of recycled polycondensates, especially recycled polyamides, to new applications, such as exterior applications.

Such recyclates are also obtained, for example, from household or industrial collections of reusable materials, or from production scrap or mandatory takeback schemes.

The invention therefore provides a process for increasing the molecular weight of polycondensates and at the same time stabilizing them, essentially without crosslinking, which comprises heating a polyamide, a polyester, a polycarbonate or a copolymer or blend of these polymers with addition of at least one diepoxide comprising terminal epoxide groups and as a further structural element a tetramethylpiperidine radical located centrally between the epoxide groups to a temperature which is above the melting point of the polymer in the case of crystalline polycondensates or above the glass point in the case of amorphous polycondensates.

In addition to polyester, polyamide and polycarbonate the present invention also embraces their copolymers and blends, such as PBT/PC, PBT/ASA, PBT/ABS, PET/ABS, PET/PC, PBT/PET/PC, PBT/PET, PA/PP and PA/ABS, and mixtures of virgin polymer and recyclate.

By polyamides, both virgin and recycled, are meant aliphatic and aromatic polyamides and copolyamides derived from diamines and dicarboxylic acids and/or from aminocarboxylic acids or from the corresponding lactams. Examples of suitable polyamides are:

PA 6, PA 11, PA 12, PA 46, PA 66, PA 69, PA 610, PA 612, and also amorphous polyamides of the Trogamid PA 6-3-T and Grilamid TR55 type. These polyamides are widely known and are available commercially.

The polyamides employed are preferably PA6 and PA6.6 or mixtures of these, and also recyclates based on them.

The polyester, both virgin and recycled, can comprise homopolyesters or copolyesters composed of aliphatic, cycloaliphatic or aromatic dicarboxylic acids and diols or hydroxy carboxylic acids.

The aliphatic dicarboxylic acids can contain 2 to 40 carbon atoms, the cycloaliphatic dicarboxylic acids 6 to 10 carbon atoms, the aromatic dicarboxylic acids 8 to 14 carbon atoms, the aliphatic hydroxy carboxylic acids 2 to 12 carbon atoms and the aromatic and cycloaliphatic hydroxy carboxylic acids 7 to 14 carbon atoms.

The aliphatic diols can contain 2 to 12 carbon atoms, the cycloaliphatic diols 5 to 8 carbon atoms and the aromatic diols 6 to 16 carbon atoms.

Aromatic diols are those where two hydroxyl groups are attached to one or more aromatic hydrocarbon radicals.

It is also possible for the polyesters to be in branched form with small amounts, for example from 0.1 to 3 mol %, based on the dicarboxylic acids present, of monomers having a functionality of more than two (e.g. pentaerythritol, trimellitic acid, 1,3,5-tri(hydroxyphenyl)benzene, 2,4-dihydroxybenzoic acid and 2-(4-hydroxyphenyl)-2-(2,4-dihydroxyphenyl)propane.

In the case of polyesters composed of 2 or more monomers, these can be distributed randomly or can be in the form of block copolymers.

Suitable dicarboxylic acids are linear and branched saturated aliphatic dicarboxylic acids, aromatic dicarboxylic acids and cycloaliphatic dicarboxylic acids. Suitable aliphatic dicarboxylic acids are those having 2 to 40 carbon atoms, examples being oxalic, malonic, dimethylmalonic, succinic, pimelic, adipic, trimethyladipic, sebacic and azelaic acid and dimer acids (dimerization products of unsaturated aliphatic carboxylic acids such as oleic acid), and alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane and 4,4'-dicyclohexyldicarboxylic acid.

Suitable aromatic dicarboxylic acids are: in particular, terephthalic, isophthalic and o-phthalic acid and also 1,3-, 1,4-, 2,6- or 2,7-naphthalenedicarboxylic acid, 4,4'-diphenyidicarboxylic acid, 4,4'-diphenyl sulfone dicarboxylic acid, 4,4'-benzophenonedicarboxylic acid, 1,1,3-trimethyl-5-carboxy-3-(p-carboxyphenyl)indane, 4,4'-diphenyl ether dicarboxylic acid, bis-p-(carboxyphenyl) methane and bis-p-(carboxyphenyl)ethane.

Preference is given to the aromatic dicarboxylic acids, especially terephthalic and isophthalic acid.

Further suitable dicarboxylic acids are those containing —CO—NH— groups; they are described in DE-A-2 414 349. Also suitable are dicarboxylic acids containing N-heterocyclic rings, examples being those derived from carboxyalkylated, carboxyphenylated or carboxybenzylated monoamine-s-triazinedicarboxylic acids (cf. DE-A-2 121 184 and 2 533 675), mono- or bishydantoins, unhalogenated or halogenated benzimidazolines or parabanic acid. The carboxyalkyl groups here can contain 3 to 20 carbon atoms.

Suitable aliphatic diols are the linear and branched aliphatic glycols, especially those having 2 to 12 and, in particular, 2 to 6 carbon atoms in the molecule. Examples are: ethylene glycol, 1,2- and 1,3-propylene glycol, 1,2-, 1,3-, 2,3- and 1,4-butanediol, pentyl glycol, neopentyl glycol, 1,6-hexanediol and 1,12-dodecanediol. An example of a suitable cycloaliphatic diol is 1,4-dihydroxycyclohexane. Examples of other suitable aliphatic diols are 1,4-bis(hydroxymethyl)cyclohexane, aromatic-aliphatic diols, such as p-xylylene glycol or 2,5-dichloro-p-xylylene glycol and 2,2-(β-hydroxyethoxyphenyl)propane, and also polyoxyalkylene glycol such as diethylene glycol, triethylene glycol, polyethylene glycol and polypropylene glycol. The alkylenediols are preferably linear and contain especially 2 to 4 carbon atoms.

Preferred diols are the alkylenediols, 1,4-dihydroxycyclohexane and 1,4-bis(hydroxymethyl) cyclohexane. Particular preference is given to ethylene glycol and 1,4-butanediol.

Other suitable aliphatic diols are the β-hydroxyalkylated bisphenols, especially β-hydroxyethylated bisphenols, such as 2,2-bis[4'-(β-hydroxyethoxy)phenyl]propane. Other bisphenols are mentioned later on.

A further group of suitable aliphatic diols are the heterocyclic diols described in the DE-A documents 1 812 003, 2 342 432, 2 342 372 and 2 453 326. Examples are: N,N'-bis(β-hydroxyethyl-5,5-dimethyl)hydantoin, N,N'-bis(β-hydroxypropyl-5,5-dimethyl)hydantoin, methylenebis[N-(β-hydroxyethyl)-5-methyl-5-ethylhydantoin], methylenebis[N-(β-hydroxyethyl)-5,5-dimethylhydantoin] and N,Nβ-bis(β-hydroxyethyl)benzylimidazolone, -(tetrachloro)benzimidazolone or -(tetrabromo) benzimidazolone.

Suitable aromatic diols are mononuclear diphenols and especially dinuclear ones which carry a hydroxyl group on each aromatic nucleus. By aromatic radicals are meant preferably hydrocarbon-aromatic radicals, such as phenylene or naphthylene. In addition, for example, to hydroquinone, resorcinol and 1,5-, 2,6- and 2,7-dihydroxynaphthalene, particular mention may be made of the bisphenols, which can be represented by the following formulae:

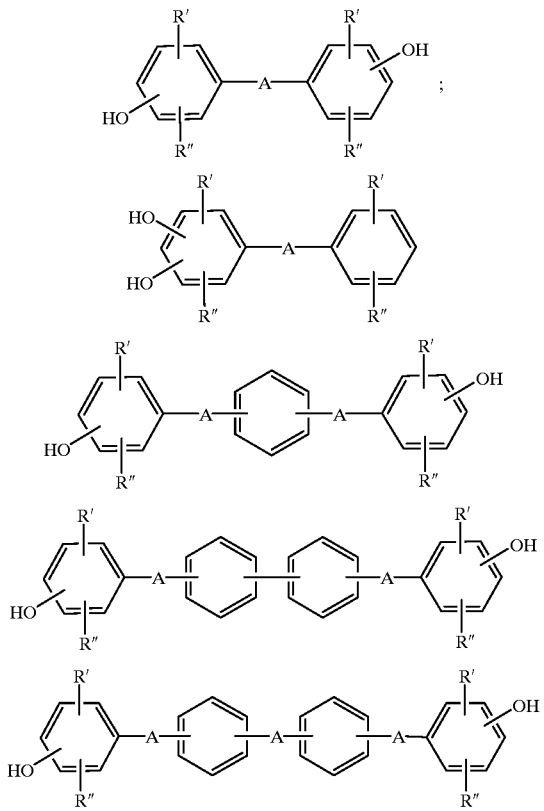

-continued

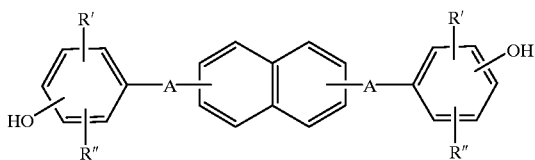

The hydroxyl groups can be in m-position but especially in p-position and R' and R" in these formulae can be alkyl of 1 to 6 carbon atoms, halogen, such as chlorine or bromine, and especially hydrogen atoms. A can be a direct bond or —O—, —S—, —(O)S(O)—, —C(O)—, —P(O) ($C_1$–$C_{20}$alkyl)-, unsubstituted or substituted alkylidene, cycloalkylidene or alkylene.

Examples of unsubstituted or substituted alkylidene are: ethylidene, 1,1- and 2,2-propylidene, 2,2-butylidene, 1,1-isobutylidene, pentylidene, hexylidene, heptylidene, octylidene, dichloroethylidene and trichloroethylidene.

Examples of unsubstituted or substituted alkylene are methylene, ethylene, phenylmethylene, diphenylmethylene and methylphenylmethylene. Examples of cycloalkylidene are cyclopentylidene, cyclohexylidene, cycloheptylidene and cyclooctylidene.

Examples of bisphenols are: bis(p-hydroxyphenyl)ether or thioether, bis(p-hydroxyphenyl) sulfone, bis(p-hydroxyphenyl)methane, bis(4-hydroxyphenyl)-2,2'-biphenyl, phenylhydroquinone, 1,2-bis(p-hydroxyphenyl) ethane, 1-phenylbis(p-hydroxyphenyl)methane, diphenylbis(p-hydroxyphenyl)methane, diphenylbis(p-hydroxyphenyl) methane, bis(3,5-dimethyl-4-hydroxyphenyl) sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- or 2,2-bis (p-hydroxyphenyl)butane, 2,2-bis(p-hydroxyphenyl) hexafluoropropane, 1,1-dichloro- or 1,1,1-trichloro-2,2-bis (p-hydroxyphenyl)ethane, 1,1-bis(p-hydroxyphenyl) cyclopentane and especially 2,2-bis(p-hydroxyphenyl) propane (bisphenol A), 1,1-bis(p-hydroxyphenyl)-3,3,5-trimethylcyclohexane and 1,1-bis(p-hydroxyphenyl) cyclohexane (bisphenol C).

Examples of suitable polyesters of hydroxy carboxylic acids are polycaprolactone, polypivalolactone and the polyesters of 4-hydroxycyclohexanecarboxylic, 2-hydroxynaphthalene-6-carboxylic and 4-hydroxybenzoic acid.

Also suitable are polymers which may contain predominantly ester linkages but also other linkages, examples of such polymers being polyesteramides and polyesterimides.

Polyesters with aromatic dicarboxylic acids have acquired the greatest importance, especially the polyalkylene terephthalates. Preference is therefore given in accordance with the invention to moulding compounds in which the polyester is composed of at least 30 mol %, preferably at least 40 mol %, of aromatic dicarboxylic acids and of at least 30 mol %, preferably at least 40 mol %, of alkylenediols having preferably 2 to 12 carbon atoms, based on the polyester.

In this case the alkylenediol, in particular, is linear and contains 2 to 6 carbon atoms, such as ethylene glycol, and tri-, tetra- and hexamethylene glycol, and the aromatic dicarboxylic acid is terephthalic and/or isophthalic acid.

Particularly suitable polyesters are polyethylene terephthalate (PET), polybutylene terephthalate (PBT), polyethylene naphthalate (PEN) and corresponding copolymers and/or blends, such as PBT/PC, PBT/ASA, PBT/ABS, PET/ABS, PET/PC or else PBT/PET/PC, with special preference being given to PET and its copolymers and to PBT blends.

By polycarbonate (PC) is meant both virgin and recycled polycarbonate. Polycarbonate (PC) is obtained, for example, from bisphenol A and phosgene or a phosgene analogue such as trichloromethyl chloroformate, triphosgene or diphenyl carbonate by condensation, in the latter case generally with addition of a suitable transesterification catalyst such as a borohydride, an amine, such as 2-methylimidazole, or a quaternary ammonium salt; in addition to bisphenol A it is also possible as well to use other bisphenol components, and halogenated monomers can also be employed in the benzene nucleus. Bisphenol components deserving of mention as being particularly suitable are 2,2-bis(4'-hydroxyphenyl) propane (bisphenol A), 2,4'-dihydroxydiphenylmethane, bis-(2-hydroxyphenyl)methane, bis(4-hydroxyphenyl)methane, bis(4-hydroxy-5-propylphenyl)methane, 1,1-bis(4'-hydroxyphenyl)ethane, bis(4-hydroxyphenyl) cyclohexylmethane, 2,2-bis(4'-hydroxyphenyl)-1-phenylpropane, 2,2-bis(3',5'-dimethyl-4'-hydroxyphenyl) propane, 2,2-bis(3',5'-dibromo-4'-hydroxyphenyl)propane, 2,2-bis(3',5'-dichloro-4'-hydroxyphenyl)propane, 1,1-bis(4'-hydroxyphenyl)cyclododecane, 1,1-bis(3',5'-dimethyl-4'-hydroxyphenyl)cyclododecane, 1,1-bis(4'-hydroxyphenyl)-3,3,5-trimethylcyclohexane, 1,1-bis(4'-hydroxyphenyl)-3,3,5,5-tetramethylcyclohexane, 1,1-bis(4'-hydroxyphenyl)-3,3,5-trimethylcyclopentane and the other bisphenols mentioned earlier above. Furthermore, the polycarbonates can also be in branched form as a result of appropriate amounts of monomers having a functionality of more than two (examples as given earlier above for the polyesters).

The polycondensate copolymers or blends which can be used in the process of the invention are prepared in a customary manner from the starting polymers.

The polyester component is preferably PBT and/or PET and the PC component a bisphenol A-based PC. The polyester:PC ratio is preferably from 95:5 to 5:95, with particular preference being given to a ratio where one component makes up at least 70%.

The invention acquires particular significance in association with recycled polycondensates as obtained from production scrap, in collections of reusable materials or through mandatory takeback schemes in the case, for example, of the automotive industry or the electrical sector. Such recycled polycondensates have undergone a wide variety of thermal and/or hydrolytic damage. Furthermore, these recycled materials—recyclates—may also include minor amounts of admixed plastics with different structures, examples being polyolefins, polyurethanes, ABS and PVC. In addition, these recyclates may also include customary impurities, such as residues of colorants, contact media or coating materials, traces of metal, traces of water, residues of fuel or service fluids, or inorganic salts. Where blends or mixtures are concerned, the compatibility can be improved by adding compatibilizers.

The polycondensate employed is with particular preference polyamide 6, polyamide 6.6 or a corresponding recyclate or copolymers or blends thereof.

Particular preference is likewise given to employing, as the polycondensate, a polybutylene terephthalate/polycarbonate blend or a blend comprising primarily polybutylene terephthalate/polycarbonate or a corresponding recyclate or a blend of a recyclate and a virgin polymer component.

Another particularly preferred polycondensate is polycarbonate or a corresponding recyclate or a blend of a recyclate and a virgin polymer component.

In the case of the polyester recyclates, very particular preference is given to polyethylene terephthalate or to a corresponding recyclate or to a blend of a recyclate and a virgin polymer component.

The diepoxides of the invention contain not only 2 epoxide groups but also at least one tetramethylpiperidine radical in the molecule.

As the diepoxide compound it is preferred to employ a compound of the formula (Ia) or (Ib)

1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl.

$C_1$–$C_{18}$Alkylene is methylene, ethylene, propylene, butylene, pentylene, hexylene, heptylene, octylene,

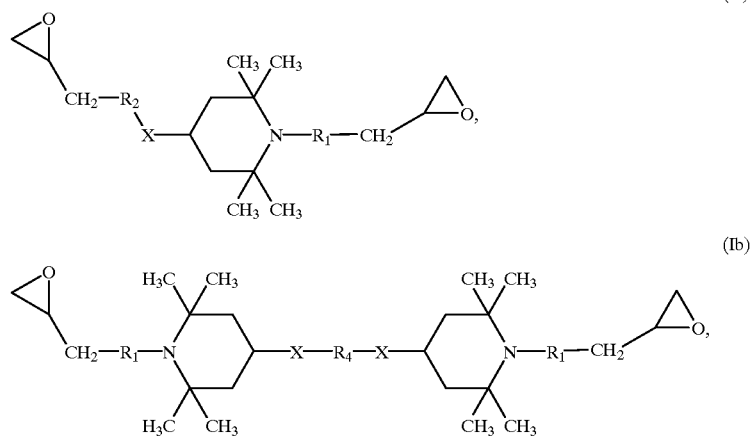

in which

R$_1$ and R$_2$ independently of one another are a direct bond, $C_1$–$C_{18}$alkylene, $C_3$–$C_{18}$alkenylene, $C_3$–$C_{18}$alkynylene, phenylene, alkylene interrupted by one or more O atoms, or are —O(CH$_2$)$_n$—, —NR$_3$—(CH$_2$)$_n$—, —(O—CH$_2$—CH$_2$)$_n$—, —S—(CH$_2$)$_n$—, —(CH$_2$)$_n$—CH(COOC$_2$H$_5$) or —(CH$_2$)$_n$—CH(CN);

R$_3$ independently is H or $C_1$–$C_{18}$alkyl;

R$_4$ is $C_2$–$C_{12}$alkylene, $C_4$–$C_{12}$alkenylene, xylylene, a divalent radical of an aliphatic dicarboxylic acid of 2 to 36 carbon atoms, of a cycloaliphatic or aromatic dicarboxylic acid of 8 to 14 carbon atoms or of an aliphatic, cycloaliphatic or aromatic dicarbamic acid of 8 to 14 carbon atoms, the dicarboxylic acid being unsubstituted or substituted in each case in the aliphatic, cycloaliphatic or aromatic moiety by 1 or 2 groups —COOR$_5$;

R$_5$ is hydrogen, $C_1$–$C_{18}$alkyl, $C_3$–$C_{12}$alkenyl, $C_5$–$C_7$cycloalkyl, phenyl or benzyl;

X is O, S or NR$_3$ and n is from 1 to 18.

Alkyl of up to 18 carbon atoms is a branched or unbranched radical such as for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, nonylene, decylene, undecylene, dodecylene, tridecylene, tetradecylene, pentadecylene, hexadecylene, heptadecylene or octadecylene and the corresponding positional isomers. Preference is given to $C_2$–$C_{12}$alkylene, especially $C_3$–$C_6$alkylene.

Alkenylene of 3 to 18 carbon atoms is a branched or unbranched radical such as for example propenylene, 2-butenylene, 3-butenylene, isobutenylene, n-2,4-pentadienylene, 3-methyl-2-butenylene, n-2-octenylene, n-2-dodecenylene, iso-dodecenylene, oleylene, n-2-octadecenylene or n-4-octadecenylene. Preference is given to alkenylene of 3 to 12, especially 3 to 6, carbon atoms.

Alkynylene of 3 to 18 carbon atoms is a branched or unbranched radical such as for example propynylene (—CH$_2$—C≡CH), 2-butynylene, 3-butynylene, n-2-octynylene or n-2-octadecynylene. Preference is given to alkynylene of 3 to 12, especially 3 to 6, carbon atoms.

Where R$_4$ is a divalent radical of a dicarboxylic acid R$_4$ is for example a malonic, succinic, glutaric, adipic, suberic, sebacic, maleic, itaconic, phthalic, dibutylmalonic, dibenzylmalonic, butyl(3,5-di-tert-butyl-4-hydroxybenzyl) malonic or bicycloheptenedicarboxylic acid radical.

$C_3$–$C_7$Cycloalkyl is for example cyclopropyl, cyclobutyl, cyclopentyl, cyclohexyl or cycloheptyl.

With particular preference the diepoxide compound employed is a compound of the formula (Ia) or (Ib)

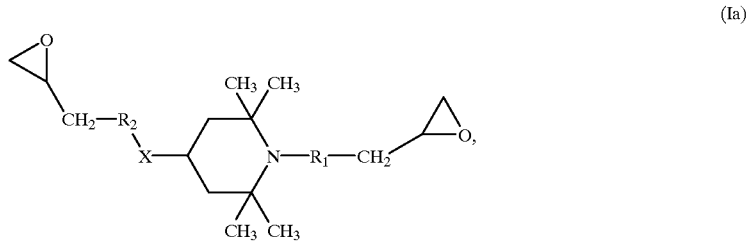

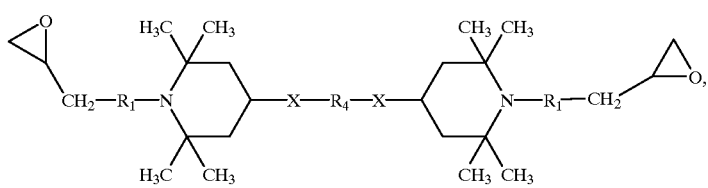

in which
R$_1$ and R$_2$ independently of one another are a direct bond, C$_1$–C$_6$alkylene, alkylene interrupted by one or more O atoms, or are —O—(CH$_2$)$_n$—, —NR$_3$—(CH$_2$)$_n$—, —(O—CH$_2$—CH$_2$)$_n$—, —(CH$_2$)$_n$—CH(COOC$_2$H$_5$) or —(CH$_2$)$_n$—CH(CN);

R$_3$ is H or C$_1$–C$_6$alkyl;

R$_4$ is C$_2$–C$_{12}$alkylene, C$_4$–C$_{12}$alkenylene, xylylene, a divalent radical of an aliphatic dicarboxylic acid of 2 to 36 carbon atoms, of a cycloaliphatic or aromatic dicarboxylic acid of 8 to 14 carbon atoms or of an aliphatic, cycloaliphatic or aromatic dicarbamic acid of 8 to 14 carbon atoms, the dicarboxylic acid being unsubstituted or substituted in each case in the aliphatic, cycloaliphatic or aromatic moiety by 1 or 2 groups —COOR$_5$;

R$_5$ is hydrogen, C$_1$–C$_6$alkyl, C$_3$–C$_6$alkenyl, C$_5$–C$_7$cycloalkyl, phenyl or benzyl;

X is O and n is from 1 to 6.

With very particular preference the diepoxide compound employed is a compound of the formula (Ia)

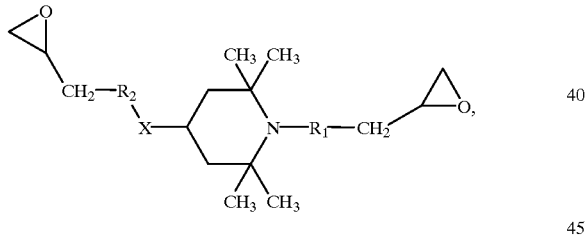

in which
R$_1$ and R$_2$ independently of one another are a direct bond, C$_1$–C$_6$alkylene, —O—(CH$_2$)$_n$—, —NR$_3$—(CH$_2$)$_n$— or —(O—CH$_2$—CH$_2$)$_n$—;

R$_3$ is H or C$_1$–C$_6$alkyl;

X is O and n is from 1 to 3.

Examples of the various substituents have been given above.

The diepoxide compound is preferably employed in an amount of from 0.05 to 10% by weight, based on the polycondensate, with particular preference from 0.1 to 5% by weight.

The diepoxide compounds are in some cases known and can be prepared by common techniques. Preparation processes can be found, for example, in EP-A-097 616, DE 2 349 962, EP-A-073 386, DE 2 425 984, DE 2 630 798 and U.S. Pat. No. 3,904,581.

A particularly suitable reaction is that of epichlorohydrin with a sterically hindered amine having two nucleophilic end groups. Examples of nucleophilic end groups are NH$_2$, NR$_2$, SH or OH groups.

It is particularly advantageous to employ a phosphonate in addition to the diepoxide compound.

Examples of phosphonates are those of the formula X

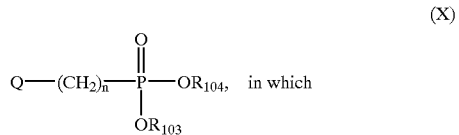

R$_{103}$ is H, C$_1$–C$_{20}$alkyl, or unsubstituted or C$_1$–C$_4$alkyl-substituted phenyl or naphthyl, R$_{104}$ is hydrogen, C$_1$–C$_{20}$alkyl, or unsubstituted or C$_1$–C$_4$alkyl-substituted phenyl or naphthyl; or is M$^{r+}$/r, M$^{r+}$ is an r-valent metal cation or the ammonium ion, n is 0, 1, 2, 3, 4, 5 or 6, and r is 1, 2, 3 or 4;

Q is hydrogen, —X—C(O)—OR$_{107}$ or a radical

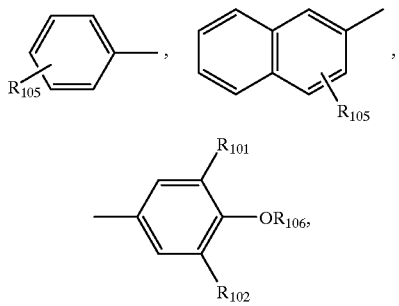

R$_{101}$ is isopropyl, tert-butyl, cyclohexyl or cyclohexyl substituted by 1–3 C$_1$–C$_4$alkyl groups, R$_{102}$ is hydrogen, C$_1$–C$_4$alkyl, cyclohexyl or cyclohexyl substituted by 1–3 C$_1$–C$_4$alkyl groups, R$_{105}$ is H, C$_1$–C$_{18}$alkyl, OH, halogen or C$_3$–C$_7$cycloalkyl;

R$_{106}$ is H, methyl, trimethylsilyl, benzyl, phenyl, sulfonyl or C$_1$–C$_{18}$alkyl;

R$_{107}$ is H, C$_1$–C$_{10}$alkyl or C$_3$–C$_7$cycloalkyl; and

X is phenylene, C$_1$–C$_4$alkyl-substituted phenylene or cyclohexylene.

Preference is given to sterically hindered hydroxyphenyl-alkyl-phosphonic esters and half-esters as are known, for example, from U.S. Pat. No. 4,778,840.

Particular preference is given to compounds of the formula (Xa)

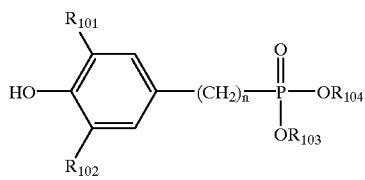

(Xa)

in which $R_{101}$ is H, isopropyl, tert-butyl, cyclohexyl, or cyclohexyl substituted by 1–3 $C_1$–$C_4$alkyl groups, $R_{102}$ is hydrogen, $C_1$–$C_4$alkyl, cyclohexyl, or cyclohexyl substituted by 1–3 $C_1$–$C_4$alkyl groups, $R_{103}$ is $C_1$–$C_{20}$alkyl or unsubstituted or $C_1$–$C_4$alkyl-substituted phenyl or naphthyl, $R_{104}$ is hydrogen, $C_1$–$C_{20}$alkyl, or unsubstituted or $C_1$–$C_4$alkyl-substituted phenyl or naphthyl; or is $M^{r+}/r$, $M^{r+}$ is an r-valent metal cation, n is 1, 2, 3, 4, 5 or 6, and r is 1, 2, 3 or 4.

Halogen is fluorine, chlorine, bromine or iodine.

Suitable alkyl substituents of up to 18 carbon atoms are the radicals such as methyl, ethyl, propyl, butyl, pentyl, hexyl and octyl, stearyl, and also corresponding branched isomers; $C_2$–$C_4$alkyls are preferred.

$C_1$–$C_4$Alkyl-substituted phenyl or naphthyl, which preferably contains 1 to 3, especially 1 or 2, alkyl groups, is for example o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, 1-methylnaphthyl, 2-methylnaphthyl, 4-methyinaphthyl, 1,6-dimethylnaphthyl or 4-tert-butylnaphthyl.

$C_1$–$C_4$Alkyl-substituted cyclohexyl, which preferably contains 1 to 3, especially 1 or 2, branched or unbranched alkyl group radicals, is for example cyclopentyl, methylcyclopentyl, dimethylcyclopentyl, cyclohexyl, methylcyclohexyl, dimethylcyclohexyl, trimethylcyclohexyl or tert-butylcyclohexyl.

A mono-, di-, tri- or tetravalent metal cation is preferably an alkali metal, alkaline earth metal, heavy metal or aluminium cation, examples being $Na^+$, $K^+$, $Mg^{++}$, $Ca^{++}$, $Ba^{++}$, $Zn^{++}$, $Al^{+++}$ and $Ti^{++++}$. $Ca^{++}$ is especially preferred.

Preferred compounds of the formula X are those having at least one tert-butyl group as the radical $R_{101}$ or $R_{102}$. Very particular preference is given to compounds in which both $R_{101}$ and $R_{102}$ are tert-butyl.

n is preferably 1 or 2 and very preferably 1.

Likewise preferred are the compounds of the formulae XII, XII, XIV, XV and XVI

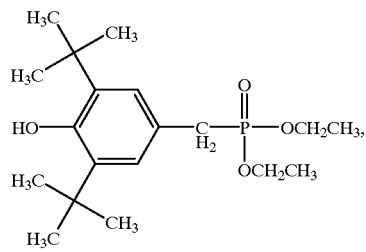

(XII)

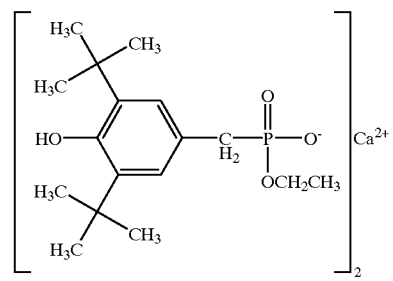

(XIII)

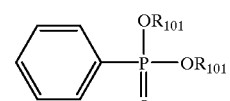

(XIV)

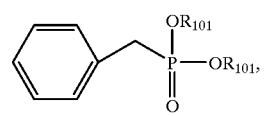

(XV)

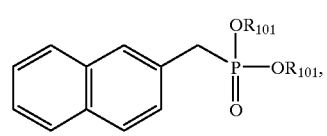

(XVI)

in which the radicals $R_{101}$ independently of one another are hydrogen or $M^{r+}/r$. Definitions of $M^{r+}/r$ have already been given above.

The compound of the formula XII is available commercially under the name Irganox®1222 (Ciba Spezialit ätenchemie) and that of the formula XII under the name Irganox®1425 (Ciba Spezialitätenchemie).

The compounds XIV, XV and XVI are in some cases available commercially or can be prepared by standard techniques.

Particularly preferred phosphonates are dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzylphosphonate, and diethyl 3,5-di-tert-butyl-4-hydroxybenzylphosphonate.

Very particular preference is given to the calcium salt of monoethyl 3,5-di-tert-butyl-4-hydroxybenzylphosphonate, and diethyl 3,5-di-tert-butyl-4-hydroxybenzylphosphonate.

The epoxide compounds employed in accordance with the invention can be combined if desired with other reactive compounds in order, for example, to achieve particular combinations of properties in as economic a manner as possible. It may, for example, be desirable to obtain a high molecular weight while accepting a somewhat lower light stability and thermal stability.

Examples of further reactive additives are given below.

1. Epoxide Compounds

I) Polyglycidyl and poly(β-methylglycidyl)esters obtainable by reacting a compound having at least two carboxyl groups in the molecule and epichlorohydrin and/or glycerol dichlorohydrin and/or β-methylepichlorohydrin. The reaction is judiciously carried out in the presence of bases.

As compounds having at least two carboxyl groups in the molecule it is possible to use aliphatic polycarboxylic acids. Examples of these polycarboxylic acids are glutaric, adipic, pimelic, suberic, azelaic, sebacic and dimerized or trimerized linoleic acid.

It is however also possible to employ cycloaliphatic polycarboxylic acids, examples being tetrahydrophthalic, 4-methyltetrahydrophthalic, hexahydrophthalic and 4-methylhexahydrophthalic acid.

Furthermore, aromatic polycarboxylic acids can be used, such as phthalic, isophthalic, trimellitic and pyromellitic acid.

It is also possible to make use of carboxyl-terminated adducts of, for example, trimellitic acid with polyols, such as glycerol or 2,2-bis(4-hydroxycyclohexyl)propane.

II) Polyglycidyl or poly(β-methylglycidyl)ethers obtainable by reacting a compound having at least two free alcoholic hydroxyl groups and/or phenolic hydroxyl groups and a suitably substituted epichlorohydrin under alkaline conditions or in the presence of an acidic catalyst with subsequent alkali treatment.

Ethers of this type are derived, for example, from acyclic alcohols, such as ethylene glycol, diethylene glycol and higher poly(oxyethylene)glycols, propane-1,2-diol, or poly (oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins.

However they are also derived, for example, from cycloaliphatic alcohols such as 1,3- or 1,4-dihydroxycyclohexane, bis(4-hydroxycyclohexyl)methane, 2,2-bis(4-hydroxycyclohexyl)propane or 1,1-bis (hydroxymethyl)-cyclohex-3-ene, or they possess aromatic nuclei, such as N,N-bis(2-hydroxyethyl)aniline or p,p'-bis (2-hydroxyethylamino)diphenylmethane.

The epoxide compounds may also be derived from mononuclear phenols, such as from resorcinol or hydroquinone; or they are based on polynuclear phenols such as on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone, or on condensation products of phenols with formaldehyde that are obtained under acidic conditions, such as phenol novolaks.

III) Poly(N-glycidyl) compounds obtainable by dehydrochlorination of the reaction products of epichlorohydrin with amines containing at least two amino hydrogen atoms. Examples of these amines are aniline, toluidine, n-butylamine, bis(4-aminophenyl)methane, m-xylylenediamine and bis(4-methylaminophenyl)methane, and also N,N,O-triglycidyl-m-aminophenol and N,N,O-triglycidyl-p-aminophenol.

The poly(N-glycidyl) compounds also, however, include N,N'-diglycidyl derivatives of cycloalkylene ureas, such as ethylene urea or 1,3-propylene urea, and N,N'-diglycidyl derivatives of hydantoins, such as of 5,5-dimethylhydantoin.

IV) Poly(S-glycidyl) compounds, such as di-S-glycidyl derivatives derived from dithiols such as ethane-1,2-dithiol or bis(4-mercaptomethylphenyl) ether.

Examples of suitable epoxides are:

a) liquid bisphenol A diglycidyl ethers such as Araldit®GY 240, Araldit®GY 250, Araldit®GY 260, Araldit®GY 266, Araldit®GY 2600, Araldit®MY 790;

b) solid bisphenol A diglycidyl ethers such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610;

c) liquid bisphenol F diglycidyl ethers such as Araldit®GY 281, Araldit®GY282, Araldit®PY 302, Araldit®PY 306;

d) solid polyglycidyl ethers of tetraphenylethane such as CG Epoxy Resin®0163;

e) solid and liquid polyglycidyl ethers of phenol-formaldehyde novolak such as EPN 1138, EPN 1139, GY 1180, PY 307;

f) solid and liquid polyglycidyl ethers of o-cresol-formaldehyde novolak such as ECN 1235, ECN 1273, ECN 1280, ECN 1299;

g) liquid glycidyl ethers of alcohols such as Shell®Glycidyl ether 162, Araldit®DY 0390, Araldit®DY 0391;

h) liquid glycidyl ethers of carboxylic acids such as Shell®Cardura E terephthalic ester, trimellitic ester, Araldit®PY 284;

i) solid heterocyclic epoxy resins (triglycidyl isocyanurate) such as Araldit®PT 810;

j) liquid cycloaliphatic epoxy resins such as Araldit®CY 179;

k) liquid N,N,O-triglycidyl ethers of p-aminophenol such as Araldit®MY 0510;

l) tetraglycidyl-4,4'-methylenebenzamine or N,N,N',N'-tetraglycidyldiaminophenylmethane such as Araldit®MY 720, Araldit®MY 721.

2. Bisoxazolines, bisoxazines, bisoxazolones or acyllactams. Compounds from these classes are described, for example, in EP-A-0 583 807 and in EP-A-0 785 967.

Preferred difunctional compounds from the class of the bisoxazolines are described by T. Loontjens et al., Makromol. Chem., Macromol. Symp. 75, 211–216 (1993) and are for example compounds of the formula

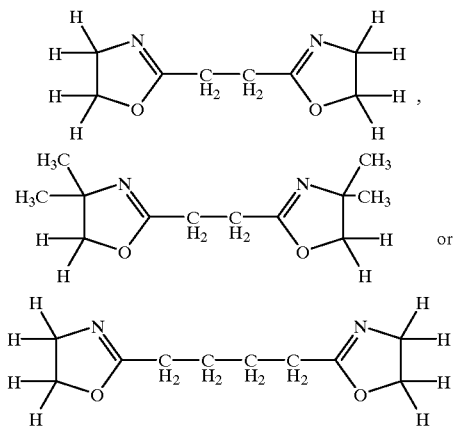

Polyfunctional, especially difunctional, compounds from the class of the oxazines or oxazolones are known and are described for example by H. Inata et al., J. Applied Polymer Science Vol. 32, 4581–4594 (1986); 2,2'-bis(4H-3,1-benzoxazin-4-one) is particularly preferred.

Polyfunctional, especially difunctional, compounds from the class of the acyllactams are for example compounds of the formula $$\underset{{}_s(H_2C)—}{\overset{O}{\underset{\|}{\text{C}}}}\!\!\!\!\!\!-N-\overset{O}{\underset{\|}{\text{C}}}-R_{126}-\overset{O}{\underset{\|}{\text{C}}}-N\!\!\!\!\!\!-\underset{—(CH_2)_s}{\overset{O}{\underset{\|}{\text{C}}}}$$

in which s is from 1 to 16, especially from 5 to 10, and $R_{126}$ is an aromatic radical.

Preference is given to acyllactams of the formula in which the lactam rings are caprolactam or laurolactam.

3. Diisocyanates, such as tetramethylene diisocyanate, hexamethylene diisocyanate, dodecamethylene diisocyanate, eicosane 1,20-diisocyanate, 4-butylhexamethylene diisocyanate, 2,2,4- or 2,4,4-trimethylhexamethylene diisocyanate, $OCN(CH_2)_2O(CH_2)_2NCO$, toluene-2,4-diisocyanate, p-phenylene diisocyanate, xylylene diisocyanates, 3-isocyanamethymethyl-3,5,5-trimethylcyclohexyl isocyanate, naphthalene diisocyanates, sulfonyl diisocyanates, 3,3'-, 4,4'- and 3,4'-diisocyanates of diphenylmethane, 2,2-diphenylpropane and diphenyl ether, 3,3'-dimethyl-4,4'-diisocyanatobiphenyl, 3,3'-dimethoxy-4, 4'-diisocyanatobiphenyl and 4,4'-diisocyanatodiphenylmethane.

4. Dicyanates such as bisphenol A dicyanate.

5. Tetracarboxylic dianhydrides, such as pyromellitic anhydride or 3,3',4,4'-benzophenonetetracarboxylic dianhydride.

6. Bismaleimides such as diphenylmethanebismaleimide or 1,3-phenylenebismaleimide.

7. Carbodiimides such as poly(2,4,6-triisopropyl-1,3-phenylenecarbodiimide).

Particular preference is given to a process in which use is made as a further reactive additive of a diepoxide which contains no 2,2,6,6-tetramethylpiperidine group. Suitable diepoxides have been described above.

In addition to the abovementioned phosphonates and reactive additives it is also possible to employ further additives. Examples are given below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-di-methyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3, 5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3, 3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3, 5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tertbutyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotrazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$ where R=3'-tert-butyl-4'-hydroxy-5'-2H-benzotriazol-2 -ylphenyl, 2-[2'-hydroxy-3'-((α,α-dimethylbenzyl)-5'-(1,1,3,3-tetramethylbutyl) phenyl]benzotriazole; 2-[2'-hydroxy-3'-(1,1,3,3-tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrodine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-di-methylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tertbutyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl)phosphite (Irgafos®168, Ciba-Geigy), tris(nonylphenyl)phosphite,

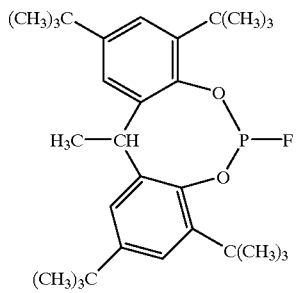

(A)

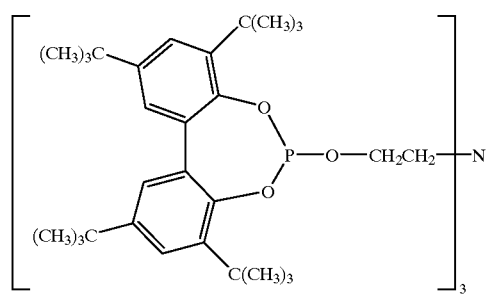

(B)

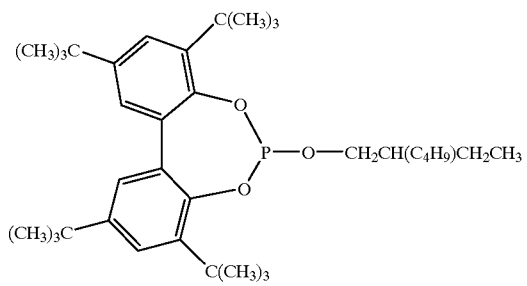

(C)

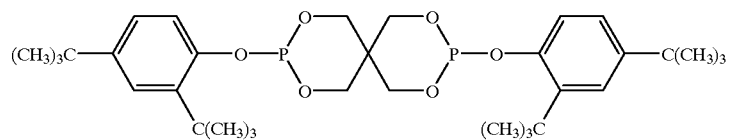

(D)

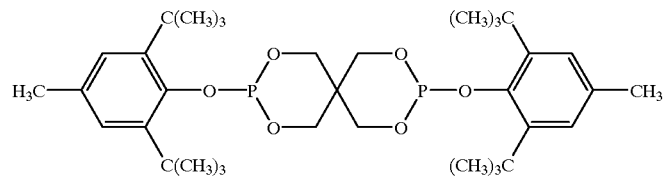

(E)

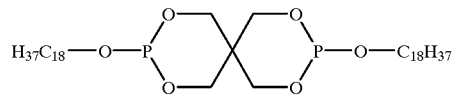

(F)

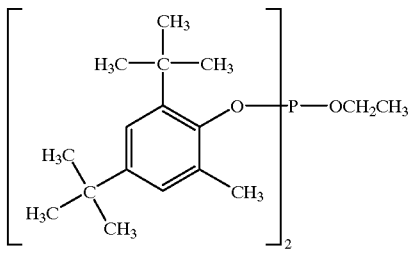

(G)

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhdroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecylalpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di-methylphenyl)-5,7-di-tert-butyl-benzofuran-2-one.

Preference is given in this context to light stabilizers from classes 2.1, 2.6 and 2.7, such as light stabilizers of the type Chimassorb 944, Chimassorb 119, Tinuvin 234, Tinuvin 312, Tinuvin 622 or Tinuvin 770. Preference is also given to aromatic phosphites or phosphonites. Likewise preferred is a process in which a phosphite and/or a sterically hindered phenol are/is employed in addition.

The process can be carried out in any vessels which can be heated and are fitted with a stirring device. These may, for example, be closed apparatus, such as kneading devices, mixers or stirred vessels. The process is preferably conducted in an extruder or kneading device. It is unimportant whether the process is operated under an inert atmosphere or in the presence of atmospheric oxygen.

The polycondensate material that is to be heated and the diepoxide or mixture of diepoxide and phosphonate are usually charged to the apparatus at the beginning of the process; however, subsequent metered addition to the polycondensate is also possible, in which case the individual components may also be added in any desired order. Heating at above the melting point or glass point is generally carried out until the diepoxide and/or phosphonate are/is distributed homogeneously, with stirring. The temperature here depends on the polycondensate used. In the case of crystalline polycondensates, it is preferred to operate in the range between melting point and a temperature about 50° C. above the melting point. In the case of amorphous polycondensates, the process is carried out, for instance, in the region between 50° C. and 150° C. above the respective glass transition temperature.

Examples of suitable temperatures are, for
PA-6 (230–270° C.);
PA-6.6 (260–300° C.);
PBT (230–280° C.);
PET (260–31 0° C.);
PBT/PC (230–280° C.); and
PC (260–320° C.).

The diepoxide and any further additives can be added, independently of one another, in the form of a liquid, powder or granules, or in compacted form, or else on a substrate material, such as silica gel, or together with a polymer powder or wax, such as a polyethylene wax, or alternatively as what is known as a masterbatch.

The invention likewise provides for the use of a diepoxide comprising terminal epoxide groups and as a further structural element a tetramethylpiperidine radical located centrally between the epoxide groups for increasing the molecular weight of, and at the same time stabilizing, a polyamide, polyester, polycarbonate or a copolymer or blend of these polymers present either as virgin polycondensate or as polycondensate recyclate or as a mixture of a recyclate and a virgin polymer component.

The invention likewise provides for the use of a mixture comprising a phosphonate and a diepoxide comprising terminal epoxide groups and as a further structural element a tetramethylpiperidine radical located centrally between the epoxide groups for increasing the molecular weight of, and at the same time stabilizing, a polyamide, polyester, polycarbonate or a copolymer or blend of these polymers present either as virgin polycondensate or as polycondensate recyclate or as a mixture of a recyclate and a virgin polymer component.

The invention additionally provides a mixture comprising a diepoxide comprising terminal epoxide groups and as a further structural element a tetramethylpiperidine radical located centrally between the epoxide groups and a virgin polycondensate or polycondensate recyclate or a mixture of a polycondensate recyclate and a virgin polymer component; and polycondensates obtainable by the process of the present invention.

The following examples illustrate the invention.

EXAMPLE A
Preparing the Diepoxides

EXAMPLE 1

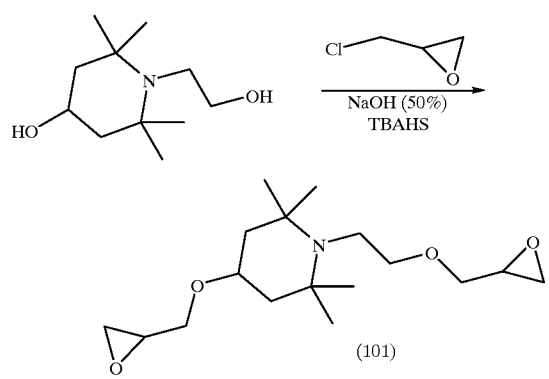

A 10 liter vessel with ground glass joints, fitted with an anchor stirrer and internal thermometer, is charged at 30° C. with 2960 g (32 mol) of epichlorohydrin, 4800 ml of 50% strength sodium hydroxide solution and 109 g (0.32 mol) of tetrabutylammonium hydrogen sulfate (TBAHS). At 25° C., 804 g (4 mol) of 1-(2-hydroxyethyl)-4-hydroxy-2,2,6,6-tetramethylpiperidine are added. The mixture is stirred vigorously until the end of formation of glycidyl ether. The organic phase is separated off, dried and concentrated on a rotary evaporator. The residue is distilled under a high vacuum. This gives 710 g (57%) of a liquid which boils at 135° C./0.01 torr.

|  | Microanalysis | |
|---|---|---|
|  | calculated | found |
| C | 65.14% | 64.97% |
| H | 9.97% | 9.94% |
| N | 4.47% | 4.54% |
| H-NMR (CDCl$_3$) | | |
| 1.11 and 1.19 ppm | 12H, s | CH$_3$ (piperidine) |
| 1.24–1.34 ppm | 2H, m | CH$_2$ (piperidine) |
| 1.82–1.87 ppm | 2H, m | CH$_2$ (piperidine) |
| 2.59–2.62 ppm | 2H, m | CH$_2$ (epoxide ring) |
| 2.65–2.70 ppm | 2H, t | —N—CH$_2$— |
| 2.78–2.81 ppm | 2H, t | CH$_2$ (epoxide ring) |
| 3.12–3.13 ppm | 2H, m | CH (epoxide ring) |
| 3.35–3.46 ppm | 4H, m | —O—CH$_2$—C—N— and —O—CH$_2$-epoxide |
| 3.55–3.63 ppm | 1H, m | >CH—O— |
| 3.65–3.75 ppm | 2H, m | —O—CH$_2$-epoxide |

EXAMPLE B

Use Examples

A polyamide, Durethan B 30 S from Bayer AG, is extruded in a Haake TW 100 twin-screw extruder together with the additives indicated in Table 1. The maximum extrusion temperature is 230° C. and the rotary speed is 50 revolutions per minute. For each sample the melt flow rate (MFR) is measured in accordance with ISO 1133 at 235° C. and 2.16 kg. The results are set out in Table 1. In this context, a decrease in the MFR denotes an increase in the molecular weight.

TABLE 1

| Experiment number | Additive | MFR (235° C./2.16 kg) |
|---|---|---|
| Comparative Example 1 | none | 35.7 |
| Comparative Example 2 | 0.5% bisphenol A diglycidyl ester Araldit ® GT 6071 | 27.1 |
| Example 1 | 0.25% diepoxide (101) from Example 1 | 22.7 |
| Example 2 | 0.50% diepoxide (101) from Example 1 | 12.2 |
| Example 3 | 1.00% diepoxide (101) from Example 1 | 2.1 |
| Comparative Example 3 | 0.50% Irganox ® 1171 | 36.5 |
| Example 4 | 0.50% diepoxide (101) from Example 1 0.25% Irganox ® 1222 | 11.1 |
| Example 5 | 0.50% diepoxide (101) from Example 1 0.25% Irganox ® 1171 | 15.2 |
| Example 6 | 0.25% diepoxide (101) from Example 1 0.25% Irganox ® 1222 | 25.4 |

Table 2 indicates the mechanical properties determined as the tensile strength after x hours of thermal ageing at 100° C.

TABLE 2

| | | Tensile strength (N/mm²) after x hours at 100° C. | | | | |
|---|---|---|---|---|---|---|
| | | x = 0 | 500 | 1000 | 1500 | 2000 |
| Comparative Example 1 | none | 74 | 88 | 56 | 34 | 28 |
| Comparative Example 2 | 0.5% bisphenol A diglycidyl ester Araldit ® GT 6071 | 77 | 85 | 62 | 40 | 31 |
| Example 1 | 0.25% diepoxide (101) from Example 1 | 72 | 86 | 65 | 44 | 35 |
| Example 2 | 0.50% diepoxide (101) from Example 1 | 71 | 85 | 78 | 54 | 33 |
| Example 3 | 1.00% diepoxide (101) from Example 1 | 71 | 84 | 80 | 73 | 38 |
| Example 4 | 0.50% diepoxide (101) from Example 1 0.25% Irganox ® 1222 | 73 | 83 | 84 | 84 | 89 |

Table 3 shows the mechanical properties after artificial weathering in an Atlas Weatherometer (WOM CI 65 A, black standard temperature 63° C., relative humidity 60% with spraying).

TABLE 2

| | | Tensile strength (N/mm²)/ Extension in % after 1000 h. |
|---|---|---|
| Comparative Example 1 | None | 28/7 |
| Comparative Example 2 | 0.5% bisphenol A diglycidyl ester Araldit ® GT 6071 | 30/8 |
| Example 2 | 0.50% diepoxide (101) from Example 1 | 48/180 |
| Example 4 | 0.50% diepoxide (101) from Example 1 0.25% Irganox ® 1222 | 62/400 |
| Example 5 | 0.50% diepoxide (101) from Example 1 0.25% Irganox ®1171 | 60/400 |
| Example 6 | 0.25% diepoxide (101) from Example 1 0.25% Irganox ® 1222 | 60/420 |

Araldit® GT 6071 and Irganox® 1222 (diethyl 3,5-di-tert-butyl-4-hydroxybenzylphosphonate) and Irganox® 1171 are commercial products of Ciba Spezialitätenchemie.

Irganox® 1171 is a mixture of 50% Irgafos 168 and 50% Irganox® 1098.

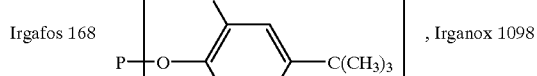

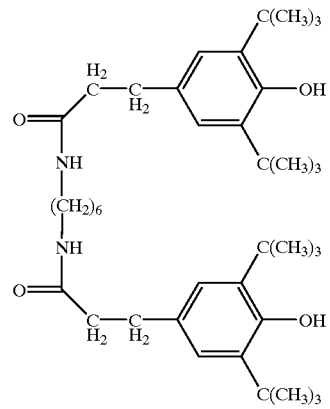

What is claimed is:

1. A process for increasing the molecular weight of polycondensates and at the same time stabilizing them, essentially without crosslinking, which comprises heating a polyamide, a polyester, a polycarbonate or a copolymer or blend of these polymers with addition of at least one diepoxide comprising terminal epoxide groups and as a further structural element a tetramethylpiperidine radical located centrally between the epoxide groups to a temperature which is above the melting point of the polymer in the case of crystalline polycondensates or above the glass point in the case of amorphous polycondensates.

2. A process according to claim 1, wherein the polycondensate is a polycondensate recyclate.

3. A process according to claim 1, wherein the diepoxide compound is employed in an amount of from 0.05 to 10%, based on the polycondensate.

4. A process according to claim 1, wherein the diepoxide compound is a compound of the formula (Ia) or (Ib),

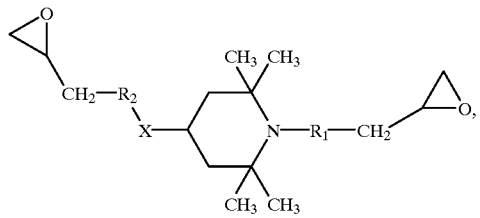

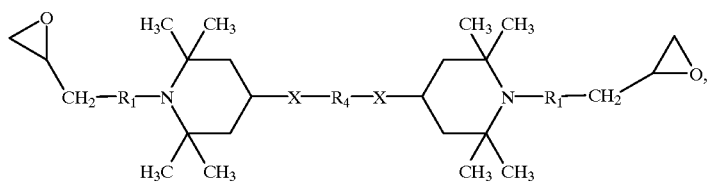

in which

R₁ and R₂ independently of one another are a direct bond, $C_1$–$C_{18}$alkylene, $C_3$–$C_{18}$alkenylene, $C_3$–$C_{18}$alkynylene, phenylene, alkylene interrupted by one or more O atoms, or are —O(CH₂)$_n$—, —NR₃—(CH₂)$_n$—, —(O—CH₂—CH₂)$_n$—, —S—(CH₂)$_n$—, —(CH₂)$_n$—CH(COOC₂H₅) or —(CH₂)$_n$—CH(CN);

R₃ independently is H or $C_1$–$C_{18}$alkyl;

R₄ is $C_2$–$C_{12}$alkylene, $C_4$–$C_{12}$alkenylene, xylylene, a divalent radical of an aliphatic dicarboxylic acid of 2 to 36 carbon atoms, of a cycloaliphatic or aromatic dicarboxylic acid of 8 to 14 carbon atoms or of an aliphatic, cycloaliphatic or aromatic dicarbamic acid of 8 to 14 carbon atoms, the dicarboxylic acid being unsubstituted or substitued in each case in the aliphatic, cycloaliphatic or aromatic moiety by 1 or 2 groups —COOR₅;

R₅ is hydrogen, $C_1$–$C_{20}$alkyl, $C_3$–$C_{12}$alkenyl, $C_5$–$C_7$cycloalkyl, phenyl or benzyl;

X is O, S or NR₃ and n is from 1 to 18.

5. A process according to claim 4, wherein the diepoxide compound is a compound of the formula (Ia) or (Ib),

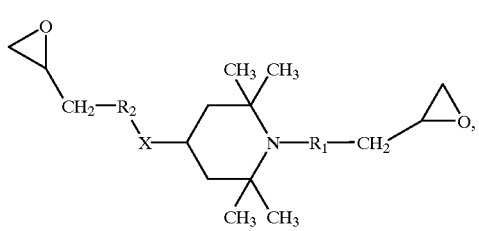

(Ia)

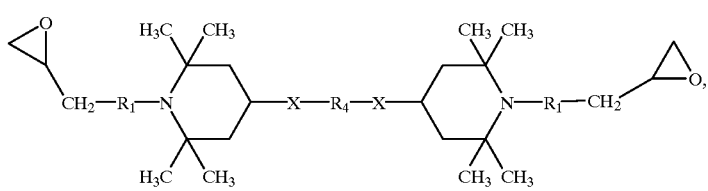

(Ib)

in which

R₁ and R₂ independently of one another are a direct bond, $C_1$–$C_6$alkylene, alkylene interrupted by one or more O atoms, or are —O—(CH₂)$_n$—, —NR₃—(CH₂)$_n$—, —(O—CH₂—CH₂)$_n$—, —(CH₂)$_n$—CH(COOC₂H₅) or —(CH₂)$_n$—CH(CN);

R₃ is H or $C_1$–$C_6$alkyl;

R₄ is $C_2$–$C_{12}$alkylene, $C_4$–$C_{12}$alkenylene, xylylene, a divalent radical of an aliphatic dicarboxylic acid of 2 to 36 carbon atoms, of a cycloaliphatic oder aromatic dicarboxylic acid of 8 to 14 carbon atoms or of an aliphatic, cycloaliphatic or aromatic dicarbamic acid of 8 to 14 carbon atoms, the dicarboxylic acid being unsubstituted or substituted in each case in the aliphatic, cycloaliphatic or aromatic moiety by 1 or 2 groups —COOR₅;

R₅ is hydrogen, $C_1$–$C_6$alkyl, $C_3$–$C_6$alkenyl, $C_5$–$C_7$cycloalkyl, phenyl or benzyl;

X is O and n is from 1 to 6.

6. A process according to claim 5, wherein the diepoxide compound is a compound of the formula (Ia),

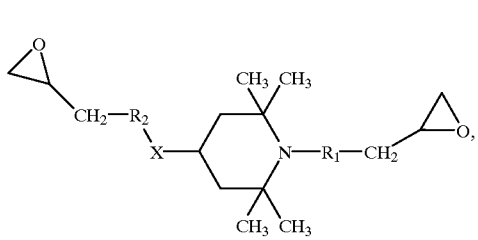

(Ia)

in which

R₁ and R₂ independently of one another are a direct bond, $C_1$–$C_6$alkylene, —O—(CH₂)$_n$—, —NR₃—(CH₂)$_n$— or —(O—CH₂—CH₂)$_n$—;

R₃ is H or $C_1$–$C_6$alkyl;

X is O and n is from 1 to 3.

7. A process according to claim 1, wherein the polycondensate employed is polyamide 6, polyamide 6.6 or a corresponding recyclate or copolymers or blends thereof.

8. A process according to claim 1, wherein the polycondensate employed is a polybutylene terephthalate/polycarbonate blend or a blend comprising primarily polybutylene terephthalate/polycarbonate or a corresponding recyclate or a blend of a recyclate and a virgin polymer component.

9. A process according to claim 1, wherein the polycondensate employed is a polycarbonate or a corresponding recyclate or a blend of a recyclate and a virgin polymer component.

10. A process according to claim 1, wherein the polycondensate employed is a PET or a corresponding recyclate or a blend of a recyclate and a virgin polymer component.

11. A process according to claim 1, wherein a phosphonate is employed in addition.

12. A process according to claim 11, wherein the phosphonate employed is diethyl 3,5-di-tert-butyl-4-hydroxybenzylphosphonate or

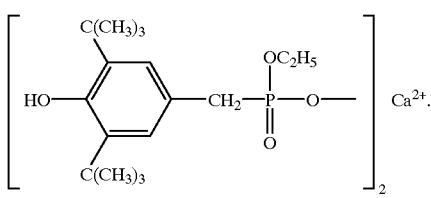

13. A process according to claim 1, wherein a phospite and/or a sterically hindered phenol are/is employed in addition.

14. A process according to claim 1, wherein as a further reactive additive a diepoxide is employed which contains no 2,2,6,6-tetramethylpiperidine group.

15. A mixture comprising a diepoxide according to claim 1 and a virgin polycondensate or polycondensate recyclate or a mixture of a polycondensate recyclate and a virgin polymer component.

16. A polycondensate obtainable by a process according to claim 1.

17. A polycondensate obtainable by a process according to claim 2.

* * * * *